(12) United States Patent
Lewis et al.

(10) Patent No.: US 9,319,290 B1
(45) Date of Patent: Apr. 19, 2016

(54) METHOD FOR CALCULATING THE SUBSCRIBABILITY OF A CHANNEL ON THE WEB

(71) Applicant: Google Inc., Mountain View, CA (US)

(72) Inventors: Justin Lewis, Marina del Ray, CA (US); Michael Patrick Schneider, Venice, CA (US); Tao Zhu, Los Angeles, CA (US)

(73) Assignee: GOOGLE INC., Mountain View, CA (US)

( * ) Notice: Subject to any disclaimer, the term of this patent is extended or adjusted under 35 U.S.C. 154(b) by 422 days.

(21) Appl. No.: 13/738,714

(22) Filed: Jan. 10, 2013

(51) Int. Cl.
*G06F 15/173* (2006.01)
*H04L 12/26* (2006.01)

(52) U.S. Cl.
CPC ................. *H04L 43/0876* (2013.01)

(58) Field of Classification Search
CPC ............. H04N 21/2743; H04N 21/44222; H04N 21/6582
See application file for complete search history.

(56) References Cited

U.S. PATENT DOCUMENTS

| | | | |
|---|---|---|---|
| 8,713,592 B2 * | 4/2014 | Patterson | H04N 21/44222 725/10 |
| 2008/0172696 A1 * | 7/2008 | Furusawa | G06F 17/30867 725/46 |
| 2011/0321072 A1 * | 12/2011 | Patterson | H04N 21/44222 725/5 |
| 2013/0166561 A1 * | 6/2013 | Georgescu | G06F 17/30746 707/739 |
| 2014/0130068 A1 * | 5/2014 | Patterson | H04N 21/44222 725/5 |

* cited by examiner

*Primary Examiner* — Mohamed Wasel
(74) *Attorney, Agent, or Firm* — Lowenstein Sandler LLP

(57) ABSTRACT

A subscribability is calculated for a channel on the web. One or more activity metrics related to the subscribability of a plurality of channels viewable over the Internet are identified. For each of the plurality of channels, an activity measure associated with the channel is obtained for each of the one or more activity metrics. For each of the plurality of channels, a subscribability score for the channel is calculated based on the one or more activity measures associated with the channel.

24 Claims, 5 Drawing Sheets

METHOD FOR CALCULATING THE SUBSCRIBABILITY OF A CHANNEL ON THE WEB

TECHNICAL FIELD

Embodiments of the present disclosure relate to the field of video watching services and, more particularly, to a method for calculating the subscribability of a channel on the web.

BACKGROUND

On the Internet, content hosting websites or other applications allow users to upload, view, and share digital content. Such digital content may include audio clips, movie clips, TV clips, and music videos, as well as amateur content such as video blogging, short original videos, pictures, photos, etc.

The content hosting website can include one or more channels or one or more channels can be viewable over the Internet. A channel is a mechanism for providing certain digital content to subscribers. Digital content for the channel can be selected by a user, uploaded by a user, selected by a content provider, or selected by a broadcaster. Users can subscribe to one or more channels. Upon subscribing, the user can view his or her subscriptions from the homepage of the content hosting site or by clicking on a "Subscriptions" link. With many channels associated with a content hosting website or viewable over the Internet, it may be difficult for a user to decide which channels to subscribe to.

SUMMARY

In one embodiment, a method to calculate the subscribability of a channel on the web is presented. One or more activity metrics related to the subscribability of a plurality of channels viewable over the Internet are identified. For each of the plurality of channels and for each of the one or more activity metrics, an activity measure associated with the channel is obtained. For each of the plurality of channels, a subscribability score for the channel is calculated based on the one or more activity measures associated with the channel.

In additional embodiments, computing devices for performing the operations of the above described embodiments are also implemented. Additionally, in embodiments of the disclosure, a computer readable storage media stores methods for performing the operations of the above described embodiments.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
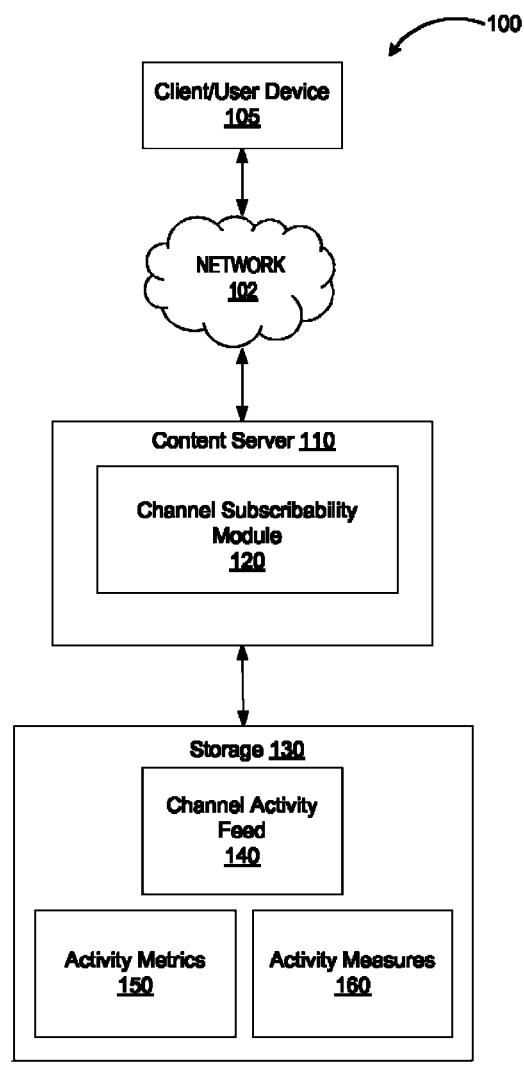
FIG. 1 illustrates an exemplary system architecture, in accordance with one embodiment of the present disclosure.

Embodiments of the disclosure pertain to calculating the subscribability of a channel on the web. A channel can be data content available from a common source or data content having a common topic or theme. The data content can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than owner of the channel, can subscribe to one or more channels in which they are interested. Once a user subscribes to a channel, the user can be presented with information from the channel's activity feed. If a user subscribes to multiple channels, the activity feed for each channel to which the user is subscribed can be combined into a syndicated activity feed. Information from the syndicated activity feed can be presented to the user.

The web, or Internet, (e.g., a content hosting website) can include a large number (e.g., millions) of channels. Some channels may be more worthwhile to subscribe to than other channels. The subscribability of a channel can measure how worthwhile it is for a user to subscribe to the channel, and can be represented by a subscribability score.

Embodiments of the present disclosure calculate the subscribability of a channel. Embodiments of the present disclosure can calculate the subscribability of multiple channels on the web (e.g., viewable over the Internet) and can provide a recommendation based on the subscribability of the channels to a user, to a content hosting website, etc. For example, a user can be provided with a list of recommended channels based on the subscribability of the channels.

The subscribability of a channel can be calculated by identifying one or more activity metrics related to the subscribability of channels, obtaining an activity measure associated with the channel for each activity metric for each channel, and computing a subscribability score for each channel based on the activity measures associated with the channel. The way in which subscribability should be measured across channels can be defined by one or more activity metrics. The activity metrics related to the subscribability can be defined by the content hosting website, the user, etc. The activity metrics may be defined by the activity of users subscribed to the channel or information associated with the activity of users subscribed to the channel. In some embodiments, the subscribability of a channel is defined by two activity metrics: 1) an activity metric that defines the quality of the channel's digital content consumed by users subscribed to the channel (e.g., a number of long watches performed by users that are subscribed to the channel, revenue generated from users that are subscribed to the channel, etc.) and 2) an activity metric that defines the frequency that the channel produces digital content (e.g., number of days since the user subscribed to the channel, number of days since the channel uploaded content, etc.). An activity measure can measure a value of the activity metric associated with a specific channel. For example, if the subscribability of a channel is measured by an activity metric of long watches and the number of long watches associated with a channel X is 3, then the activity measure for channel X is 3.

FIG. 1 illustrates an exemplary system architecture 100, in accordance with one embodiment of the present disclosure.

System 100 comprises a client/user device 105 in communication with (e.g., coupled to) a content server 110 over a network 102, and a storage 130. The network 102 may be a private network (e.g., a local area network (LAN), a wide area network (WAN), intranet, etc.), a corporate network (e.g., a private network for an organization such as a corporation), a broadcast network, a public network (e.g., the Internet), a wired network (e.g., Ethernet network), a wireless network (e.g., an 802.11 network) and/or a cellular network (e.g., a Long Term Evolution (LTE) network).

The client/user device 105 may be any type of computing device, for example, a device including a processor, a computer-readable medium, and a memory. In some embodiments, the client/user device 105 may be executing a browser application or other application adapted to communicate over Internet related protocols (e.g., TCP/IP and HTTP) and/or display a user interface. While only a single client/user device 105 is shown in FIG. 1, system 100 may support a large number of concurrent sessions with many client/user devices 105.

The content server 110 may include computing devices that have a wide range of processing capabilities such a personal computer (PC), a server computer, a personal digital assistant (PDA), a smart phone, a laptop computer, a netbook computer, a tablet device, and/or any machine capable of executing a set of instructions (sequential or otherwise) that specify actions to be taken by that machine. Embodiments of the disclosure may operate within a single server device or on multiple server devices.

In one embodiment, the content server 110 provides digital content (e.g., digital video, streaming video, images, digital music, streaming music, social media information, etc.) to one or more of the client/user device 105. For example, the content server 110 may provide digital content, such as a streaming video, requested from an activity feed for a channel by a user for playback on the client/user device 105 via the network 102.

Storage 130 can include one or more writable persistent storage devices, such as memories, tapes or disks. Although each of content server 110 and storage system 130 are depicted in FIG. 1 as single, disparate components, these components may be implemented together in a single device or networked in various combinations of multiple different devices that operate together. Examples of devices may include, but are not limited to, servers, mainframe computers, networked computers, process-based devices, and similar type of systems and devices.

Storage 130 may include channel activity feed 140, activity metrics 150, and activity measures 160. Channel activity feed 140 may include an activity feed for each channel viewable over the Internet (e.g., using a content hosting website). Channel activity feed 140 may include identification information for various channels, such as an identifier of the channel (e.g., name of the channel, etc.), one or more identifiers of activities associated with the channel (e.g., an upload of digital content to the channel, a like of digital content on another channel, etc.), and one or more identifiers of digital content on which the activities were performed (e.g., the name of the digital content that was uploaded to the channel, the name of the digital content on another channel that was liked, etc.). Activity metrics 150 may include one or more activity metrics related to the subscribability of various channels. Activity metrics 150 may include identification information for various activity metrics, such as an identifier of an activity metric (e.g., name) or an identifier for information of an activity metric (e.g., name) that relates to the subscribability of a channel. Activity metrics can include long watches (e.g., per-formed by users that are subscribed to the channel), revenue generated from users that are subscribed to the channel, an amount of time since the user subscribed to the channel, an amount of time since the channel uploaded content, etc. Activity measures 160 may include information for an activity measure for each activity metric in activity metrics 150. Activity measures 160 can include a value for each activity metric in activity metrics 150 for a specific channel and can be based on the activity feed in channel activity feed 140 for the channel. The activity measures 160 can be collected by sending a request to a server for the activity measures, by determining actions associated with the channel that meet the activity metric and equating information associated with the actions to the activity measure, etc.

In embodiments of the disclosure, the content server 110 notifies end users of the types of information that are stored on storage 130, and provides the end users the opportunity to choose not to have such information collected, analyzed, and/or shared.

During operation of system 100, a user accesses system 100 via client/user device 105 over network 102. The content server 110 receives communications from the client/user device 105, and processes and/or directs these communications accordingly.

As discussed above, conventionally, the Internet, including a content hosting website on the web, can include a very large number of channels, and a user may not know which channels are worth subscribing to. Embodiments of the present disclosure address this problem by calculating a subscribability for channels on the web and providing a recommendation to the user including channels to subscribe to.

In particular, in one embodiment, when a user loads a page (e.g., homepage) for the content hosting site, the content server 110 presents the channels with the highest subscribability to the user on the loaded page. The channels with the highest subscribability can be identified by calculating a subscribability for the channels viewable over the Internet (e.g., available on the content hosting website). In one embodiment, the content server 110 includes a channel subscribability module 120 that calculates the subscribability of channels viewable over the Internet by identifying one or more activity metrics for the channel that are related to the subscribability of the channel, obtaining an activity measure associated with the channel for each activity metric, and computing a subscribability score for the channel based on the activity measures associated with the channel.

The channel subscribability module can identify the one or more activity metrics using activity metrics 150 stored in the storage system 130. The activity metrics related to the subscribability can be defined by the content hosting website, the user, etc. The activity metrics may be defined by the activity of users subscribed to the channel or information associated with the activity of users subscribed to the channel. In some embodiments, the subscribability of a channel is defined by two activity metrics: 1) an activity metric that defines the quality of the channel's digital content consumed by users subscribed to the channel (e.g., the number of long watches (e.g., viewing of content for a time period above a threshold) performed by users that are subscribed to the channel, revenue generated from users that are subscribed to the channel, etc.) and 2) an activity metric that defines the frequency that the channel produces digital content (e.g., number of days since the user subscribed to the channel, number of days since the channel uploaded content, etc.). In one embodiment, activity metrics 150 includes one or more general activity metrics to use to calculate the subscribability for channels viewable over the Internet (e.g., using the content hosting website). In this embodiment, the channel subscribability module 120 can identify the one or more activity metrics for the channel by obtaining one or more the activity metrics stored in activity metrics 150. In an alternate embodiment, activity metrics 150 includes specific metrics to use for specific channels (e.g., identified in a list of identifiers). For example, activity metrics 150 can include a first list of activity metrics to use for a first list of channels and a second list of activity metrics to use for a second list of channels. In this embodiment, the channel subscribability module 120 can identify the activity metrics to use for the channel by obtaining the list of activity metrics in activity metrics 150 that correspond to an identifier for the channel. For example, if activity metrics A, B, and C are identified for a first list of channels, activity metrics D, E, and F are identified for a second list of channels, and channel X is included in the first list of channels, then the activity metrics obtained for channel X are A, B, and C.

Activity measures associated with the channel can be obtained for each activity metric using activity measures 160 stored in the storage system 130. For example, the activity measures 160 may identify a value for the activity metric associated with a specific channel. In one embodiment, the activity measures 160 specify a value for each activity metric identified in activity metrics 150 for the channel. In one embodiment, the activity measure is based on user actions performed in response to an activity included in the activity feed stored in activity feed information 140 for the channel. In some embodiments, for an activity metric that defines the quality of the channel's digital content consumed by users subscribed to the channel using the number of long watches performed by users that are subscribed to the channel, the activity measure is the actual number of long watches performed by users that are subscribed to the channel. For example, when a channel X uploads digital content Y, the upload information, such as a link to digital content Y, is included in an activity feed for the channel. The activity feed is available to the subscribers of the channel. In this example, if the activity metrics for channel X include a number of long watches and the subscribers of channel X have performed 3 long watches in response to the activity feed for channel X, the activity measures for channel X would include a value of 3 for channel X corresponding to the activity metric of number of long watches.

The channel subscribability module 120 calculates a subscribability score for a channel based on the activity measures associated with the channel stored in activity measures 160. In one embodiment, the subscribability score is calculated by performing a computation on the one or more activity measures. In an alternate embodiment, the subscribability score is calculated using a formula and plugging in the values for the activity measures into the formula.

In some embodiments, the channel subscribability module 120 provides a recommendation based on the subscribability of channels. In one embodiment, the channel subscribability module 120 provides the channel recommendations based on the subscribability scores for the channels by comparing the subscribability scores and recommending a predefined number of channels with the highest subscribability scores (e.g., the 3 channels with the highest subscribability scores). The recommendation may then be provided to client/user device 105, and presented to the user using an application (e.g., a web browser) on the client/user device 105. For example, the recommendation may be included in a webpage associated with a content hosting site on the web. An exemplary webpage including a recommendation based on the subscribability of channels is discussed in more detail below in conjunction with FIG. 3.

Figure 2:
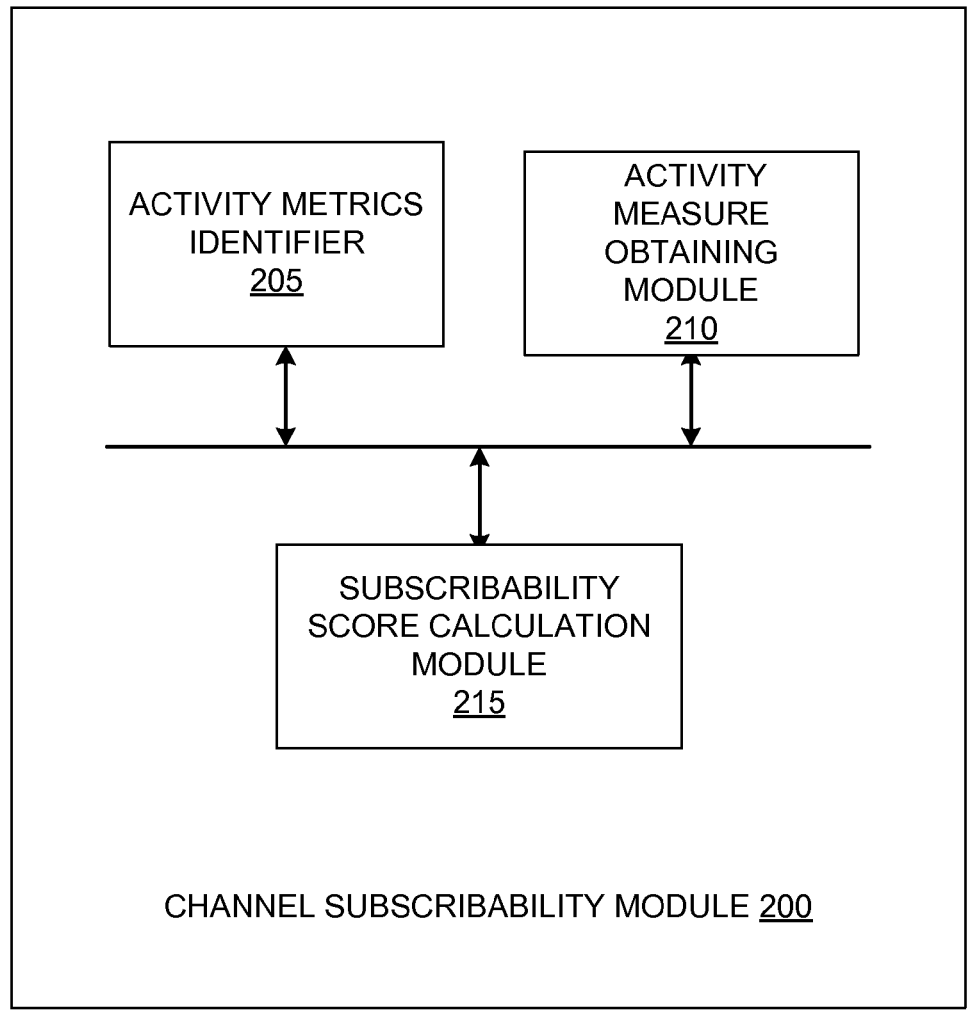
FIG. 2 illustrates a channel subscribability module, in accordance with one embodiment of the present disclosure.

FIG. 2 illustrates a channel subscribability module 200, in accordance with one embodiment of the present disclosure. The channel subscribability module 200 may include an activity metrics identifier 205, an activity measure obtaining module 210, and a subscribability score calculation module 215. More or less components may be included in the channel subscribability module 200 without loss of generality.

The activity metrics identifier 205 may identify one or more activity metrics related to the subscribability of one or more channels. In one embodiment, the activity metrics identifier 205 identifies the one or more activity metrics using activity metrics 150 in storage 130, shown in FIG. 1. In another embodiment, the activity metrics identifier 205 obtains the one or more activity metrics from other computing devices (e.g., other servers not shown in the figures, such as a datacenter) via the network 102 or may obtain the one or more activity metrics from a memory (e.g., a hard disk, flash memory, random access memory (RAM), etc.).

The activity measure obtaining module 210 may obtain an activity measure associated with the channel for each activity metric. Each activity measure associated with the channel can measure a value of the activity metric that is associated with a specific channel. In one embodiment, the activity measure obtaining module 210 identifies the each activity measure using activity measures 160 in storage 130, shown in FIG. 1. In another embodiment, the activity measure obtaining module 210 obtains the one or more activity measures from other computing devices (e.g., other servers not shown in the figures, such as a datacenter) via the network 102 or may obtain the one or more activity metrics from a memory (e.g., a hard disk, flash memory, random access memory (RAM), etc.).

The subscribability score calculation module 215 may calculate a subscribability score for a channel based on the activity measures associated with the channel. In one embodiment, the subscribability score is calculated by performing a computation on the one or more activity measures. In an alternate embodiment, the subscribability score is calculated using the activity measures in a formula. In some embodiments, the subscribability score calculation module 215 provides a recommendation based on the subscribability scores. In one embodiment, the subscribability score calculation module 215 provides the channel recommendation based on the subscribability scores by comparing the subscribability scores and recommending a predefined number of channels with the highest subscribability scores (e.g., the 3 channels with the highest subscribability scores).

Figure 3:
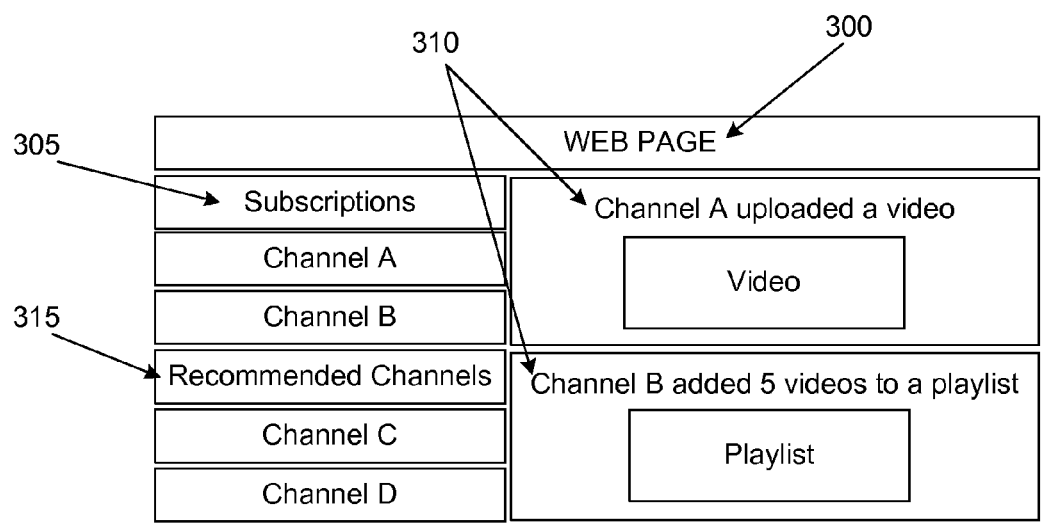
FIG. 3 illustrates a content hosting website page, in accordance with one embodiment of the present disclosure.

FIG. 3 is an example web page 300 in accordance with one embodiment of the present disclosure. In one embodiment, the web page 300 is a homepage of a user of a content hosting website. The web page 300 includes subscriptions 305, syndicated activity feed 310, and recommended channels 315. The subscriptions 305 can include the name of the channels to which the user is currently subscribed to. In one embodiment, the subscriptions 305 include a list of all channels to which the user is subscribed to. In an alternate embodiment, the subscriptions 305 include a subset of channels to which the user is subscribed to. In this embodiment, the number of channels in the subset of channels can be a predefined number of channels (e.g., 5 channels), the channels that the user accesses the most frequently, the channels that the user accesses the most recently, the channels that the user has most recently subscribed to, etc. Other embodiments of determining the channels to include in a subset of channels displayed can be used without departing from the scope of the disclosure. Subscriptions 305 includes the channel names "Channel A" and "Channel B" to present to the user that the user is currently subscribed to channel A and channel B.

The syndicated activity feed 310 can include information from a syndicated feed of activities associated with channels to which the user is subscribed. In one embodiment, the syndicated activity feed 310 can include information about the most recent activities associated with each channel (e.g., digital content uploaded to the channel, etc.), as well as a mechanism for the user to perform an action for that activity (e.g., providing a frame of the digital content uploaded to the channel that serves as a link to the digital content). If the user uses the syndicated activity feed 310 to perform an action, that action can be associated with the channel which performed the activity. The syndicated activity feed 310 includes information that "Channel A uploaded a video," as well as a frame of the video which the user can click to view the video. The syndicated activity feed 310 also includes information that "Channel B added 5 videos to a playlist," as well as the playlist, which can include links to the videos added to the playlist. Although a portion of a video and a playlist are shown as being included in the syndicated activity feed 310, it should be understood that in other embodiments, other syndicated activity feed information may be shown in the web page 300. For example, an image (e.g., a JPEG) may be shown in the web page 300. In another example, digital music (e.g., an MP3) may be played in the web page 300. In yet another example, social media information (e.g., a tweet, a like, etc.) may be shown in the web page 300.

The recommended channels 315 can include recommended channels for the user that are based on the subscribability for channels associated with the content hosting site. In one embodiment, the recommended channels 315 include an indicator (e.g., graphic such as an arrow) next to each recommended channel. In one embodiment, when a user clicks on the graphic, a menu appears on the web page 300 listing digital content associated with the recommended channel. In an alternate embodiment, when a user clicks on the graphic, a popup window including a graphic representation (e.g., picture of a single frame from the digital content) of digital content in the recommended channel appears on the web page 300. It should be understood that in other embodiments, other indicators such as graphic representations, and/or text can be presented to a user to provide recommended channels based on the subscribability of channels associated with a content hosting site.

Figure 4:
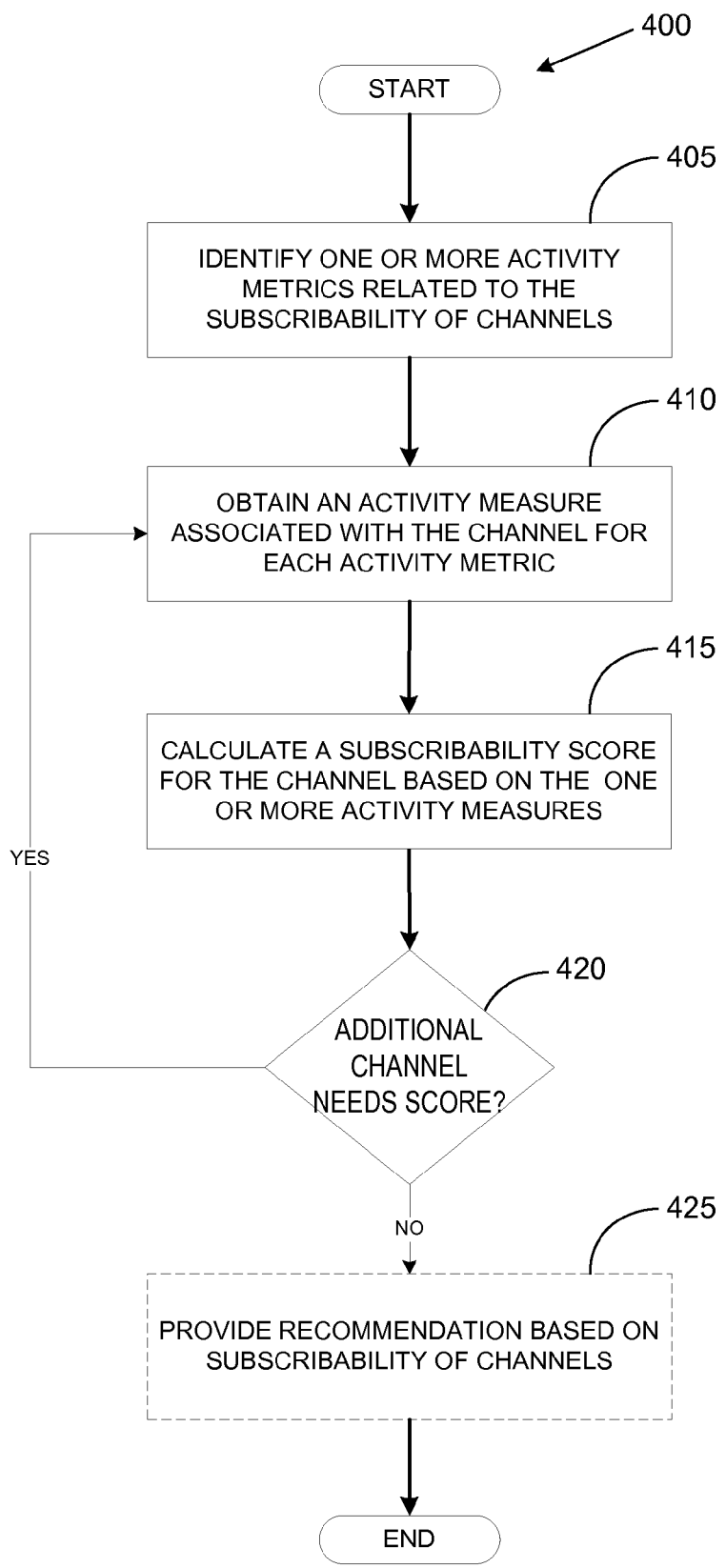
FIG. 4 is a flow diagram illustrating one embodiment for a method of calculating the subscribability of a channel on the web.

FIG. 4 is a flow diagram illustrating an embodiment for a method 400 of calculating the subscribability of a channel. The method 400 may be performed by processing logic that may include hardware (e.g., circuitry, dedicated logic, programmable logic, microcode, etc.), software (e.g., instructions run on a processing device to perform hardware simulation), or a combination thereof. In one embodiment, the method 400 is performed by a server (e.g., the content server 110 of FIG. 1).

At block 405, processing logic identifies one or more activity metrics related to or associated with the subscribability of one or more channels. In one embodiment, processing logic identifies the one or more activity metrics related to the subscribability of the one or more channels by receiving the one or more activity metrics from a content hosting website, a computing system, or from a user. In an alternate embodiment, processing logic identifies the one or more activity metrics related to the subscribability of one or more channels by requesting the activity metrics from a computing system. In another alternate embodiment, processing logic identifies the one or more activity metrics related to the subscribability of one or more channels using machine learning techniques.

A channel can be data content available from a common source or data content having a common topic or theme. The data content can be digital content chosen by a user, digital content made available by a user, digital content uploaded by a user, digital content chosen by a content provider, digital content chosen by a broadcaster, etc. The channel can include an identifier for the channel (e.g., name of the channel) and identifiers for the one or more selections of digital content (e.g., names of the digital content).

The subscribability of a channel can be represented by one or more activity metrics. An activity metric can be defined by the activity of users subscribed to the channel or information associated with the activity of users subscribed to the channel. In some embodiments, the subscribability of a channel is defined by two activity metrics: 1) an activity metric that defines the quality of the channel's digital content consumed by users subscribed to the channel (e.g., a number of long watches performed by users that are subscribed to the channel, revenue generated from users that are subscribed to the channel, etc.) and 2) an activity metric that defines the frequency that the channel produces digital content (e.g., number of days since the user subscribed to the channel, number of days since the channel uploaded content, etc.). Examples of activity metrics can include a number of watches performed by users subscribed to the channel, a number of long watches performed by users subscribed to the channel, a total amount of time spent by users subscribed to the channel on a website or the Internet, an amount of revenue generated by the users subscribed to the channel, etc. A watch can be an activity related to the consumption of digital content, such as a viewing of any portion of digital content, listening to any portion of digital content, etc. A long watch can be an activity related to the consumption of digital content that is longer than a predetermined amount. In one embodiment, the predetermined amount is a predefined period of time, such as 30 seconds. In an alternate embodiment, the predetermined amount is a predefined percentage of the total length of the digital content, such as 80%. In one embodiment, the number of long watches is an aggregate of long watches for recent subscribers to the channel, such as subscribers that have subscribed to the channel in the last day, in the last seven days, in the last thirty days, etc. In an alternate embodiment, the number of long watches is an aggregate of long watches for subscribers based on criteria other than time, such as a random selection of subscribers, subscribers that are in a particular locale, etc. An amount of time spent by users subscribed to a channel can be an amount of time (e.g., seconds, minutes, etc.) that the users spent on a website or the Internet. An amount of revenue generated by users subscribed to a channel can be an amount of revenue generated by a website or by the channel viewable over the Internet because of the users being on the website or viewing the channel over the Internet (e.g., advertising revenue from users clicking on advertisements on the website or clicking on advertisements available on the channel viewable over the Internet, advertising revenue from users being on the website or viewing the channel over the Internet, etc.).

At block 410, processing logic obtains an activity measure for each activity metric based on an activity feed associated with the channel. The activity measure can measure a value of the activity metric associated with a specific channel. In one embodiment, the activity measure is based on one or more user actions performed in response to an activity included in the activity feed for the channel. In an alternate embodiment, the activity measure is based on one or more user actions performed in response to an activity associated with the channel (e.g., clicking on digital content associated with the channel). In another alternate embodiment, the activity measure is based on an activity external to the channel (e.g., clicking on a link of another channel).

The activity measure can be based on one or more user actions performed in response to an activity included in the activity feed for the channel by determining user actions that were performed because of activities included in the activity feed. A channel, or a user associated with the channel (e.g., owner of the channel), can perform various activities, such as making digital content available on the channel, liking digital content associated with another channel, commenting on digital content associated with another channel, etc. The source of the activities performed by a channel can be an identifier of the channel. When an activity is performed by a channel, the activity can be included in an activity feed associated with the channel. The activity feed for a channel can include some or all of the activities associated with the channel. The activity feed can be provided to subscribers of the channel. The activity feed can be provided by updating a webpage for each subscriber to include a visual representation of the most recent activity or activities in the activity feed (e.g., a frame of digital content, a link to digital content, etc.), providing a written communication of the most recent activity or activities in the feed (e.g., a pop-up window, an email communication, a notice, etc.), etc. In one embodiment, the activity feed is provided to a subscriber of the channel in a syndicated activity feed presented to the subscriber on a website or viewable by the user over the Internet. In one embodiment, when a subscriber performs an action based on an activity included in the activity feed (e.g., clicking on a link in the activity feed and watching digital content from the link, etc.), the action can be associated with the channel. For example, a channel X has subscribers A, B, and C. When channel X uploads new digital content Y, the upload action is added to an activity feed for channel X and a website (e.g., homepage) or other mechanism viewable over the Internet associated with each of subscribers A, B, and C is updated to include a link to the digital content Y. When subscriber A clicks on the link to digital content Y, any future event based on that click (e.g., a subscriber A watching the digital content) will be associated with channel Y. If subscriber B clicks on the link to digital content Y, any future event based on that click (e.g., subscriber B watching the digital content) will also be associated with channel Y. If the activity metric related to the subscribability of channel Y is a number of long watches (e.g., a watch that is more than 30 seconds), and subscriber A watched the entire digital content and subscriber B watched the first 10 seconds, then the activity measure for the number of long watches for channel Y will be 1, based on the action of subscriber A. The activity measure will not include the action of subscriber B because subscriber B's watch time was not longer than the predefined time of 30 seconds.

In one embodiment, processing logic obtains the activity measure for each activity metric by sending a request to a server for the activity measure. An activity measure for a number of long watches can be requested using the request: num_long_watches=stats.watch_stats( ).num_long_watches. An activity measure for a number of days since a user has subscribed to a channel can be requested using the request: num_days=stats.age_bracket(bracket), where bracket is the number of days (e.g., 1 day, 3 days, 7 days, etc.). A total number of users that watched a channel within a certain number of days after they subscribed to the channel can be requested using: num_users=stats.watch( ).num_watched_users( ).

In an alternate embodiment, processing logic obtains the activity measure for each activity metric by determining actions associated with the channel that meet the activity metric and equating information associated with the actions to the activity measure. For example, if an activity metric is a long watch time, then actions that resulted in a long watch time can determined from the channel and the number of actions that meet the long watch time can be included in the activity measure. In another example, if an activity metric is revenue generated by the channel, the actions associated with the channel (e.g., clicks on advertisements, etc) that resulted in revenue are determined from the channel and the number of actions or the total amount of revenue generated by the actions is included in the activity measure.

In one embodiment, for multiple activity metrics, the activity measure can be obtained for each activity metric and a total activity measure can be computed by performing a calculation (e.g., addition, subtraction, multiplication, division, average, etc.) on the obtained activity measures. For example, if the activity metrics include a number of long watches and a number of total users, the activity measure for the number of long watches is obtained and the activity measure for the number of total users is obtained, and a computation (e.g., addition) can be performed on the obtained values to generate an overall activity measure for the number of long watches for the number of total users. In another example, the activity metrics includes a number of long watches that happen one day after a subscription, a number of long watches that happen seven days after a subscription, a number of long watches that happen thirty days after a subscription, a number of watches that happen one day after a subscription, a number of watches that happen seven days after a subscription, and a number of long watches that happen thirty days after a subscription. The activity measures can be obtained for each activity metric to use in calculating the subscribability score.

At block 415, a subscribability score is calculated for the channel based on the one or more activity measures. The subscribability score can be calculated for the channel based on the one or more activity measures by performing a computation on the one or more activity measures. In one embodiment, a predefined formula is applied to the activity measures. In one embodiment, a weight can be assigned to one or more of the activity measures depending on the importance of the activity measure. For example, a higher weight can be used for an activity measure that is very important (e.g., number of long watches) and a lower weight can be assigned for an activity measure that is not as important (e.g., a number of total watches). The weight or weights can be assigned by a content hosting website, a user, etc.

In one embodiment, the subscribability score of a channel is defined as an average score for the channel over multiple periods of time using the formula:

$$\text{subscribability score} \mathrel{+}= (\text{score for each period of time} / \text{number of periods of time}).$$

For example, the periods of time can be 1 day after subscription, 7 days after subscription, and 30 days after subscription. The score for each period of time can be defined as:

$$\text{score} = (\text{num\_long\_watches} / \text{num\_days}) * (1 + \text{co\_lw\_avg} * \text{lw\_avg\_norm} + \text{co\_lw\_ratio} * \text{lw\_ratio}), \text{ where}$$

num_long_watches is a number of long watches for the channel for the period of time, num_days is a number of days since a user subscribed to the channel, lw_avg_norm is a normalized value of the number of long watches per user per day, the number of long watches per user per day=(num_long_watches/

(num_users*num_days), num_users is a total number of subscribers that watched the channel within num_days after they subscribed to the channel, lw_ratio is a ratio of the number of long watches to the total number of watches for the channe=num_long_watches/num_watches, co_lw_avg is a weight or coefficient for the normalized value of the number of long watches per user per day, and co_lw_ratio is a weight or coefficient for the ratio of the number of long watchees to the total number of watches.

In an alternate embodiment, the subscribability score is calculated for a specific locale. In this embodiment, the subscribability score for the specific locale is calculated by obtaining activity measures for the specific locale and performing a computation using the obtained activity measures. In an alternate embodiment, the subscribability score for the specific locale is calculated by computing an overall subscribability score for all locales, calculating a multiplier for the specific locale, and computing the subscribability score for the specific locale using the overall score and the multiplier.

For example, the locale score can be calculated using the formula for a subscribability score as described above. A locale multiplier can be calculated using a formula comparing a number of subscribers from the locale to a total number of subscribers for all locales for the channel: locale_multiplier=channel_stats.num_subscribers_from(locale)/channel_stats.num_total_subscribers. The subscribability score for the channel for the locale can be computed by performing a computation (e.g., multiplying) the overall subscribability score and the multiplier. For example, locale_subscribability_score=locale_multiplier*overall_subscribability_score.

At block 420, processing logic determines if an additional channel needs a subscribability score. In one embodiment, processing logic determines if an additional channel needs a subscribability score by accessing a list of channels requiring a subscribability score and determining if each channel in the list has a corresponding subscribability score. In an alternate embodiment, processing logic determines if an additional channel needs a subscribability score by determining if all channels associated with a website (e.g., content hosting website) or all channels viewable over the Internet have a subscribability score. If processing logic determines that an additional channel needs a subscribability score, the method 400 returns to block 410 to obtain an activity measure for each activity metric for the additional channel. If processing logic that no additional channel needs a subscribability score, the method 400 proceeds to block 425.

At block 425, processing logic provides a recommendation based on the subscribability of channels. In one embodiment, processing logic provides a recommendation to a content hosting website to which the channels belong. In an alternate embodiment, processing logic provides a recommendation to a user, such as a subscriber of a channel or an owner of a channel. In one embodiment, processing logic provides the recommendation based on the subscribability of channels by comparing the subscribability scores of the channels and recommending a predefined number of channels with the highest subscribability scores. For example, the 5 channels with the highest subscribability scores are included in the recommendation. In an alternate embodiment, processing logic provides the recommendation based on the subscribability scores by combining the subscribability scores with a user's history and suggesting a predefined number of channels based on the combination. In one embodiment, the subscribability scores are combined with a user's history by accessing the user's history of consumed digital content, determining a type of digital content consumed by the user, and including other channels with the type or a similar type of digital content that have the highest subscribability scores for the type or similar type of digital content. For example, if a user's history shows that the user enjoys country music, the country music channels with the highest subscribability scores will be recommended to the user. In an alternate embodiment, the subscribability scores are combined with a user's history by accessing a user's list of recommended channels (e.g., personalized list) and removing channels from the user's list of recommended channels that have a subscribability score that is below a predefined threshold. For example, if a user's list of recommended channel includes X and Y, channel X has a subscribability score of 10, channel Y has a subscribability score of 1, and the predefined threshold for the subscribability of a channel is 5, channel Y is removed from the user's list of recommended channels because the subscribability score of 1 for channel Y is below the threshold value of 5.

Figure 5:
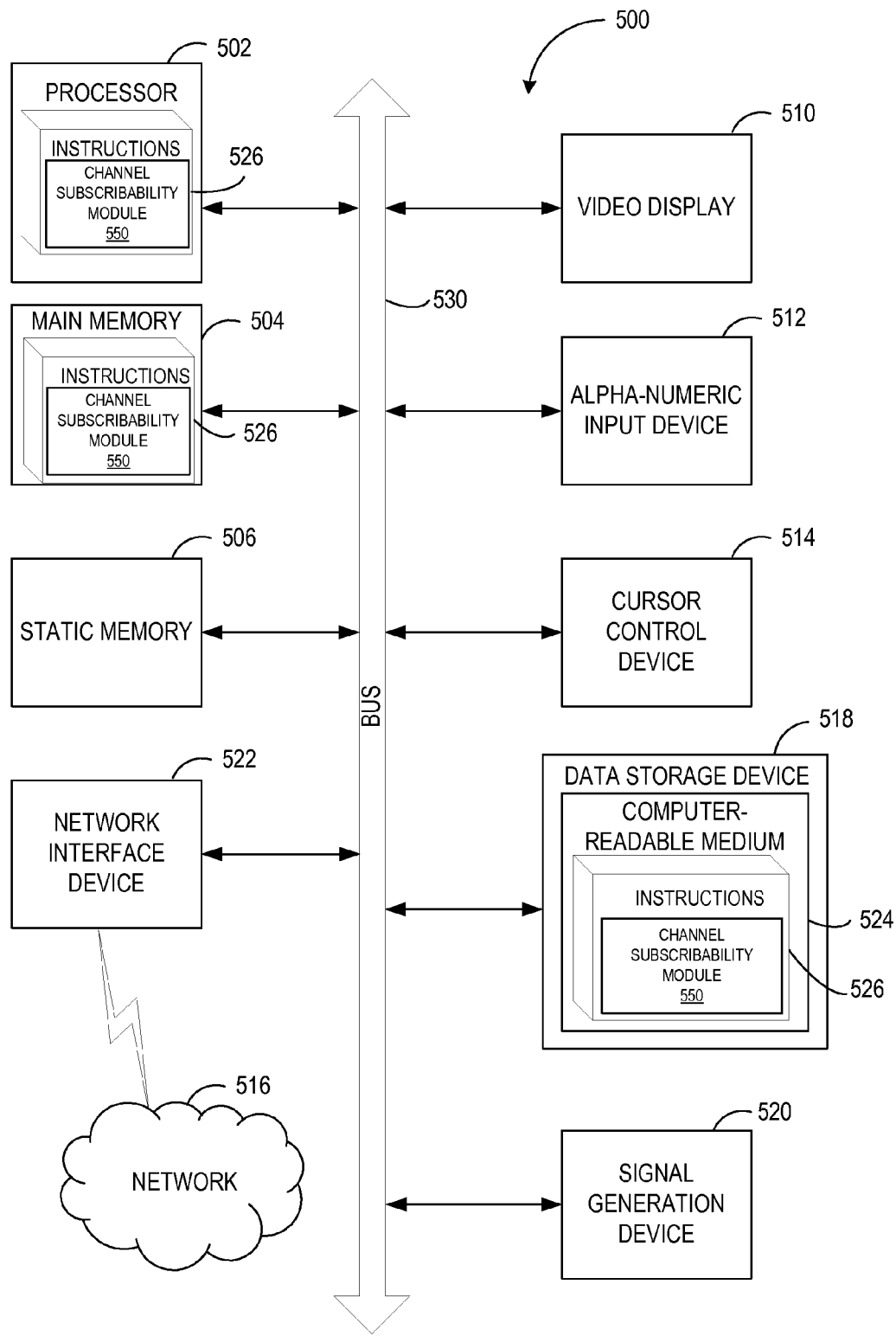
FIG. 5 is a block diagram of an exemplary computer system that may perform one or more of the operations described herein.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 526 for performing the operations and steps discussed herein.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 518 may include a computer-readable storage medium 524 on which is stored one or more sets of instructions 526 (e.g., software) embodying any one or more of the methodologies or functions described herein. The instructions 526 may also reside, completely or at least partially, within the main memory 504 and/or within the processor 502 during execution thereof by the computer system 500, the main memory 504 and the processor 502 also constituting computer-readable storage media. The instructions 526 may further be transmitted or received over a network 516 via the network interface device 522.

In one embodiment, the instructions 526 include instructions for a channel subscribability module 550, which may correspond to channel subscribability module 120 of FIG. 1, and/or a software library containing methods that calculate a subscribability score for a channel. While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining", "computing", "calculating", "obtaining", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

We claim:

1. A method, implemented by a server computing system, comprising:
   identifying, by the server computing system, one or more activity metrics related to subscribability of a plurality of channels viewable over the Internet, the one or more activity metrics are associated with consumption of channel content by subscribers of each of the plurality of channels; and
   for each of the plurality of channels:
      for one or more activity metrics, obtaining, by the server computing system, an activity measure associated with the channel, wherein the activity measure pertains to long watches of the channel by subscribers of the channel, each long watch of the channel representing a consumption of content of the channel that exceeds a predetermined duration; and
      calculating, by the server computing system, a subscribability score for the channel based on one or more activity measures associated with the channel, the subscribability score for the channel reflecting a number of long watches of the channel by the subscribers of the channel over a plurality of subscription time intervals.

2. The method of claim 1, further comprising:
   providing a recommendation based on the plurality of subscribability scores for the plurality of channels viewable over the Internet, where the recommendation comprises a recommended channel to subscribe to.

3. The method of claim 1, wherein a channel comprises a channel identifier for the channel and one or more identifiers for digital content associated with the channel.

4. The method of claim 1, wherein the activity measure is based on an activity feed associated with the channel, wherein the activity feed comprises an activity that associates digital content with the channel.

5. The method of claim 4, wherein the activity that associates digital content with the channel comprises at least one of: making the digital content available on the channel, liking the digital content, commenting on the digital content, or adding the digital content to a playlist associated with the channel.

6. The method of claim 4, wherein each of the one or more activity measures comprises a value for the corresponding activity metric associated with the channel, wherein the value is based on a user action performed in response to an activity in the activity feed associated with the channel.

7. The method of claim 1, wherein the one or more activity metrics related to subscribability of the plurality of channels comprise at least one of: a long watch time, a total watch time, a total overall time, or revenue.

8. The method of claim 1, wherein calculating the subscribability score for the channel based on the one or more activity measures comprises using the one or more activity measures in a subscribability score formula, wherein the subscribability score formula comprises a weight for at least one of the activity measures.

9. A non-transitory computer readable storage medium having instructions that, when executed by a processing device, cause the processing device to perform operations comprising:
  identifying one or more activity metrics related to subscribability of a plurality of channels viewable over the Internet, the one or more activity metrics are associated with consumption of channel content by subscribers of each of the plurality of channels; and
  for each of the plurality of channels:
    for one or more activity metrics, obtaining an activity measure associated with the channel, wherein the activity measure pertains to long watches of the channel by subscribers of the channel, each long watch of the channel representing a consumption of content of the channel that exceeds a predetermined duration; and
    calculating, by the server computing system, a subscribability score for the channel based on one or more activity measures associated with the channel, the subscribability score for the channel reflecting a number of long watches of the channel by the subscribers of the channel over a plurality of subscription time intervals.

10. The non-transitory computer readable storage medium of claim 9, wherein the instructions, when executed by the processing device, cause the processing device to perform further operations comprising:
  providing a recommendation based on the plurality of subscribability scores for the plurality of channels viewable over the Internet, where the recommendation comprises a recommended channel to subscribe to.

11. The non-transitory computer readable storage medium of claim 9, wherein a channel comprises a channel identifier for the channel and one or more identifiers for digital content associated with the channel.

12. The non-transitory computer readable storage medium of claim 9, wherein the activity measure is based on an activity feed associated with the channel, wherein the activity feed comprises an activity that associates digital content with the channel.

13. The non-transitory computer readable storage medium of claim 12, wherein the activity that associates digital content with the channel comprises at least one of: making the digital content available on the channel, liking the digital content, commenting on the digital content, or adding the digital content to a playlist associated with the channel.

14. The non-transitory computer readable storage medium of claim 12, wherein each of the one or more activity measures comprises a value for the corresponding activity metric associated with the channel, wherein the value is based on a user action performed in response to an activity in the activity feed associated with the channel.

15. The non-transitory computer readable storage medium of claim 9, wherein the one or more activity metrics related to subscribability of the plurality of channels comprise at least one of: a long watch time, a total watch time, a total overall time, or revenue.

16. The non-transitory computer readable storage medium of claim 9, wherein calculating the subscribability score for the channel based on the one or more activity measures comprises using the one or more activity measures in a subscribability score formula, wherein the subscribability score formula comprises a weight for at least one of the activity measures.

17. A computing device comprising:
  a memory; and
  a processing device coupled to the memory, wherein the processing device is configured to:
    identify one or more activity metrics related to subscribability of a plurality of channels viewable over the Internet, the one or more activity metrics are associated with consumption of channel content by subscribers of each of the plurality of channels; and
    for each of the plurality of channels:
      for one or more activity metrics, obtain an activity measure associated with the channel, wherein the activity measure pertains to long watches of the channel by subscribers of the channel, each long watch of the channel representing a consumption of content of the channel that exceeds a predetermined duration; and
      calculate a subscribability score for the channel based on one or more activity measures associated with the channel, the subscribability score for the channel reflecting a number of long watches of the channel by the subscribers of the channel over a plurality of subscription time intervals.

18. The computing device of claim 17, wherein the processing device is further configured to provide a channel recommendation based on the plurality of subscribability scores for the plurality of channels viewable over the Internet, where the channel recommendation comprises a recommended channel to subscribe to.

19. The computing device of claim 17, wherein a channel comprises a channel identifier for the channel and one or more identifiers for digital content associated with the channel.

20. The computing device of claim 17, wherein the activity measure is based on an activity feed associated with the channel, wherein the activity feed comprises an activity that associates digital content with the channel.

21. The computing device of claim 20, wherein the activity that associates digital content with the channel comprises at least one of: making the digital content available on the channel, liking the digital content, commenting on the digital content, or adding the digital content to a playlist associated with the channel.

22. The computing device of claim 20, wherein each of the one or more activity measures comprises a value for the corresponding activity metric associated with the channel, wherein the value is based on a user action performed in response to an activity in the activity feed associated with the channel.

23. The computing device of claim 17, wherein the one or more activity metrics related to subscribability of the plurality of channels comprise at least one of: a long watch time, a total watch time, a total overall time, or revenue.

24. The computing device of claim 17, wherein calculating the subscribability score for the channel based on the one or more activity measures comprises using the one or more activity measures in a subscribability score formula, wherein the subscribability score formula comprises a weight for at least one of the activity measures.

\* \* \* \* \*